(12) United States Patent
Grosman et al.

(10) Patent No.: US 12,130,796 B2
(45) Date of Patent: Oct. 29, 2024

(54) METHOD AND APPARATUS FOR DISTRIBUTED DATABASE TRANSACTIONS USING GLOBAL TIMESTAMPING

(71) Applicant: HUAWEI TECHNOLOGIES CO., LTD., Shenzhen (CN)

(72) Inventors: Ronen Grosman, Markham (CA); Emad Boctor, Toronto (CA); Ping Chen, Markham (CA); Chaoyi Kuang, Mississauga (CA); Yuk Kuen Chan, Markham (CA); Hoi Ieng Lao, Markham (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 200 days.

(21) Appl. No.: 17/535,832

(22) Filed: Nov. 26, 2021

(65) Prior Publication Data

US 2022/0171756 A1 Jun. 2, 2022

Related U.S. Application Data

(60) Provisional application No. 63/119,319, filed on Nov. 30, 2020.

(51) Int. Cl.
*G06F 16/23* (2019.01)
*G06F 16/21* (2019.01)
*G06F 16/215* (2019.01)

(52) U.S. Cl.
CPC ........ *G06F 16/2308* (2019.01); *G06F 16/215* (2019.01); *G06F 16/219* (2019.01); *G06F 16/2386* (2019.01)

(58) Field of Classification Search
CPC .. G06F 16/2308; G06F 16/215; G06F 16/219; G06F 16/2386
See application file for complete search history.

(56) References Cited

U.S. PATENT DOCUMENTS 9,531,647 B1 * 12/2016 Goyal ................... H04L 67/62
2008/0071925 A1 3/2008 Leighton et al.
(Continued)

FOREIGN PATENT DOCUMENTS

| CN | 104714883 A | 6/2015 |
| CN | 106462594 A | 2/2017 |

(Continued)

OTHER PUBLICATIONS

"A Decentralized Deadlock-free Concurrency Control Method for Multidatabase Transactions", Raj Kumar Batra, 2015) (Year: 2015).*
(Continued)

*Primary Examiner* — Maher N Algibhah

(57) ABSTRACT

A method and system for implementing concurrency control in a database system includes receiving a request from a node for handling by a GTM. Registering the request in a slot in a tracking array where each of the slots represents one of the requests for handling by the GTM. A slot is acquired, and a segment of the tracking array is scanned to determine a batch of pending requests. The batch is used to produce an aggregate request and the aggregate request includes an aggregate increment of a total number of commit requests of the batch. The aggregate request is sent to the GTM using one of a plurality of pre-established connections. A response is received from the GTM that includes a current value of an incremented timestamp. The incremented timestamp is distributed to the requests of the batch and the lock is released.

20 Claims, 11 Drawing Sheets

(56) References Cited

U.S. PATENT DOCUMENTS

2015/0293966 A1* 10/2015 Cai .................. G06F 16/24532
707/648
2018/0314517 A1* 11/2018 Iwanir .................. G06F 21/563

FOREIGN PATENT DOCUMENTS

CN 108984571 A 12/2018
WO WO-2018223789 A1 * 12/2018 ............. G06F 16/27

OTHER PUBLICATIONS

WO-2018223789-A1 Translated (Year: 2018).*

* cited by examiner

METHOD AND APPARATUS FOR DISTRIBUTED DATABASE TRANSACTIONS USING GLOBAL TIMESTAMPING

CROSS-REFERENCE TO RELATED APPLICATIONS

This application claims the benefit of priority to U.S. Provisional Application Ser. No. 63/119,319 filed Nov. 30, 2020, the contents of which are hereby incorporated by reference.

FIELD OF THE DISCLOSURE

The present disclosure pertains to relational database management systems (RDBMS), and in particular to a method and apparatus for implementing multi-version concurrency control (MVCC) in a distributed RDBMS.

BACKGROUND

In distributed RDBMS, database transactions are required to guarantee data validity in the face of power failures, network failures, other errors, and a variety of other potential mishaps. ACID (atomicity, consistency, isolation, and durability) is a set of properties that guarantees data validity. Isolation of each transaction is a primary requirement of RDBMS and it is commonly achieved using methods known as multi-version concurrency control (MVCC).

In a distributed RDBMS, transactions are often executed concurrently on different clusters, nodes, or threads. Isolation supports a condition in which concurrent transactions leave the database in the same state as if the transactions were executed sequentially. For example, a read transaction should not be able to see the changes of a currently running transaction. Rather, the read transaction should read the effects of transactions already committed before the currently running transaction started. The list of currently running transactions is known as a "snapshot."

A mechanism to assign a timestamp for each transaction is therefore required to implement MVCC. In a distributed RDBMS, a unique and monotonically increasing Commit Sequence Number (CSN) is used as a central time oracle (logical global clock or logical clock) to obtain snapshots and for commit ordering. In a distributed database system, a transaction may be processed on multiple nodes so the CSN must be available globally. The CSN is used to uniquely identifies a point in time when a transaction is committed to the database.

Using a CSN to implement MVCC requires that for every transaction, a node must query a central global transaction manager (GTM) server through a dedicated TCP/IP socket connection in order to obtain the current value of the global CSN for a snapshot and another to increment the global value to indicate a transaction commit. Each transaction requires a separate request to the GTM server. For a large cluster having multiple nodes handling a large number of transactions on each node, the network bandwidth and the GTM server CPU become overwhelmed and become a severe performance bottleneck.

Therefore, there is a need for a method and apparatus for a node to obtain the current value or the CSN or to increment the CSN that obviates or mitigates one or more limitations of the prior art.

This background information is provided to reveal information believed by the applicant to be of possible relevance to the present disclosure. No admission is necessarily intended, nor should be construed, that any of the preceding information constitutes prior art against the present disclosure.

SUMMARY

An object of embodiments of the present disclosure is to provide a method and apparatus for obtaining a global timestamp, such as a CSN, from a GTM server. A pool of a limited number of persistent connections are created to the GTM server. Multiple requests, snapshot requests, commit requests, or a combination of the two are combined into a single batch request to the GTM server. The result from the GTM server is processed with limited (e.g. minimal) lock contention and the results are distributed for each request to support correctness when satisfying database requests.

In accordance with embodiments of the present disclosure, there is provided a method for implementing multi-version concurrency control in a distributed database management system. The method includes receiving a request from a node, where the request is to be handled by a Global Transaction Manager (GTM). A backend registers the request in a slot in a tracking array including a plurality of slots. Each of the plurality of slots represents one of a plurality of requests for handling by the GTM. The plurality of requests includes the request. The backend acquires a lock of the slot and scans a segment of the tracking array to determine a batch of pending requests where the batch includes the request. The batch is used to produce an aggregate request that includes an aggregate increment of a total number of commit requests of the batch. The aggregate request is sent using one of a plurality of pre-established connections to the GTM. A response is received from the GTM that includes a current value of an incremented timestamp. The incremented timestamp is then distributed to the plurality of requests of the batch and the backend releases the lock of the slot.

This provides the technical benefit that for multiple requests, only one request is sent on one connection to the GTM server, thereby reducing the required bandwidth, reducing the load, and avoiding performance degradation of the GTM server.

In further embodiments, the slot is determined by incrementing a counter of the tracking array and using a value of the incremented counter as an index into the slots of the tracking array.

In further embodiments, each of the plurality of slots includes a status.

In further embodiments, the value is used by the backend as an identifier of the request.

In further embodiments, distributing the timestamp to the plurality of requests of the batch includes updating a status of the plurality of requests to indicate that the plurality of requests have been satisfied.

Embodiments further include, in response to releasing the lock of the slot, waking a plurality of backends which have generated some or all of the plurality of requests of the batch. For example, in further embodiments, in response to releasing the lock of the slot, waking a plurality of backends of the plurality of requests of the batch.

In accordance with embodiments of the present disclosure, there is provided a system for implementing multi-version concurrency control in a distributed database management system. The system includes a plurality of computing devices including a processor and a non-transient memory for storing instructions which when executed by the processor cause the system to receive a request from a node for handling by a Global Transaction Manager (GTM). A backend of the system registers the request in a slot in a tracking array including a plurality of slots, each of which represents one of a plurality of requests for handling by the GTM, including the request. The backend acquires a lock of the slot and scans a segment of the tracking array to determine a batch of pending requests, the batch including the request. The batch is used to produce an aggregate request including an aggregate increment of a total number of commit requests of the batch. The backend uses one of a plurality of pre-established connections to send the aggregate request to the GTM. The backend receives a response from the GTM including a current value of an incremented timestamp and distributes the incremented timestamp to the plurality of requests of the batch. The backend may then release the lock of the slot.

Embodiments have been described above in conjunctions with aspects of the present disclosure upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Figure 1:
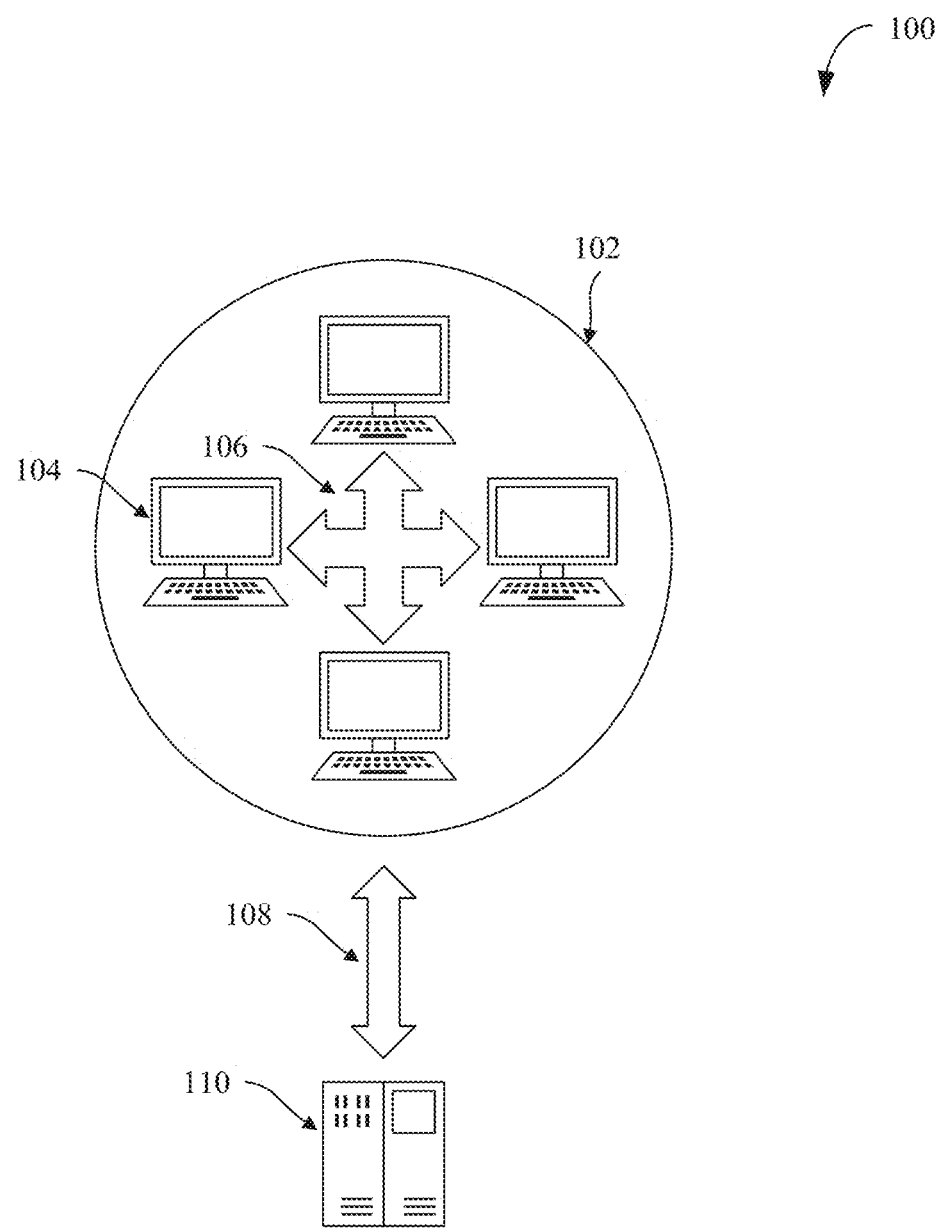
FIG. 1 illustrates an architectural view of a RDBMS, according to an embodiment.

As used herein, the term "about" should be read as including variation from the nominal value, for example, a +/−10% variation from the nominal value. It is to be understood that such a variation is always included in a given value provided herein, whether or not it is specifically referred to.

An object of embodiments of the present disclosure is to provide a method and apparatus for obtaining a global timestamp, such as a CSN or other sequence number, from a GTM server. A pool of a limited number of persistent connections are created to the GTM server. Multiple requests, for example, snapshot requests, commit requests, or a combination thereof are combined into a single batch request to the GTM server. The result from the GTM server is processed with limited (e.g. minimal) lock contention and results are distributed for each request to facilitate correctness when satisfying database requests. Requests included in the batch request will complete and produce the same result as if each request sent its own timestamp request to the GTM server separately. In embodiments utilizing batching, one backend can collect and process all the outstanding requests from several backends. Some backends may be requesting the current timestamp CSN and other may be requesting to increment the global timestamp. One backend is configured to satisfy multiple (e.g. all) requests with one call to the GTM server.

As used herein, a distributed DBMS is a DBMS or RDBMS that has transactions taking place on multiple nodes (e.g. computers). Transactions refer to a unit of work that may affect the database contents. A transaction may be a read-only transaction or an update (commit) transaction that changes the state of the database. All changes to the database in one transaction are often required to be atomic, that is the transaction completes in its entirety or not at all. ACID (Atomicity, Consistency, Isolation and Durability) are four attributes of a DBMS. In particular, isolation refers to the property where concurrent transactions leave the database in the same state as if the transactions were executed sequentially. For example, a read transaction should not be able to see the changes due to a currently running transaction. It should read the effects of transactions already committed before this transaction started. A list of currently running transactions is called a snapshot. Multi-version concurrency control (MVCC) is a common way to achieve isolation. In MVCC, each transaction is assigned a timestamp or sequence number when it starts. When a data item gets updated by a transaction, a new copy of the data item is created. Each transaction will see the versions of data items that have been committed before its timestamp. Therefore, each transaction sees a "snapshot" of the database according to its timestamp. One form of timestamp is a logical global clock which provides a mechanism that uses a centrally obtained counter as a logical way to order transactions in a distributed DBMS. The counter acts as a timestamp and in embodiments, may be referred to as a "Central Time Oracle". In embodiments a logical global clock may also be implemented by a commit sequence number (CSN).

As used herein a "backend" refers to a thread in database process, such as a PostgreSQL process, that handles the work needed to satisfy a user query including all transactions from this query. The backend may run on a physical or virtual computing environment as is known in the art. The backend may alternatively refer to a part of a computing apparatus which implements such a thread.

FIG. 1 illustrates an architectural view 100 of a RDBMS, according to an embodiment. Computer nodes 104 are arranged into clusters 106 connected by a network 106. An arbitrary number of clusters 102 may be configured with an arbitrary number of nodes 104 based on the requirements of the RDBMS such as required performance, latency, geographic location, etc. Network 106 may also be configured with sufficient bandwidth and latency to allow the nodes of the cluster to perform according to requirements. Clusters 102 are in communication with a server 110 over a network 108 to enable communication of database requests, snapshots, database portions, or entire sets of database data.

Figure 2:
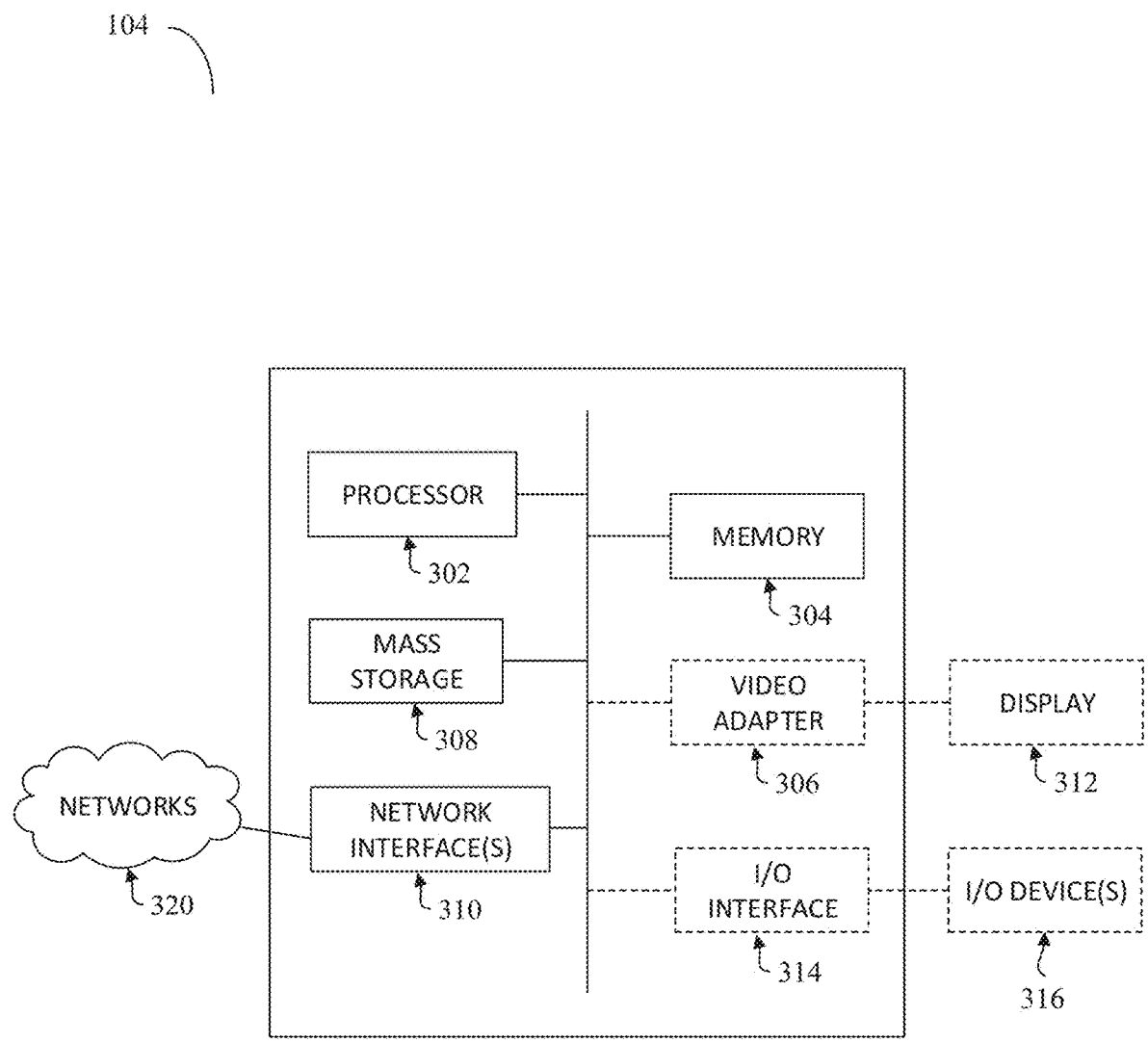
FIG. 2 illustrates an architectural view of an electronic device as may be used within a RDBMS, according to an embodiment.

FIG. 2 is a schematic diagram of a computing device that may be included in node 104 and may perform any or all of operations of the above methods and features explicitly or implicitly described herein, according to different embodiments of the present disclosure. As shown, the device includes a processor 302, such as a Central Processing Unit (CPU) or specialized processors such as a Graphics Processing Unit (GPU) or other such processor unit, memory 304, non-transitory mass storage 308, and network interface 310, all of which are communicatively coupled via bus. In particular, network interface 310 provides a connection to networks 320 that includes networks 106, 108, or other wired or wireless networks. According to certain embodiments, any or all of the depicted elements may be utilized, or only a subset of the elements.

Optionally, video adapter 306 may be included to provide a user interface on display 312, or I/O interface 314 may be provide to provide interfaces to elements such as may be used by a user or operator such as a keyboard, mouse, or various USB devices, etc. Further, the computing device 104 may contain multiple instances of certain elements, such as multiple processors, memories, or transceivers. Also, elements of the hardware device may be directly coupled to other elements without the bus. Additionally, or alternatively to a processor and memory, other electronics, such as integrated circuits, may be employed for performing the required logical operations.

The memory 304 may include any type of non-transitory memory such as static random access memory (SRAM), dynamic random access memory (DRAM), synchronous DRAM (SDRAM), read-only memory (ROM), any combination of such, or the like. The mass storage element 308 may include any type of non-transitory storage device, such as a solid state drive, hard disk drive, a magnetic disk drive, an optical disk drive, USB drive, or any computer program product configured to store data and machine executable program code. According to certain embodiments, the memory 304 or mass storage 308 may have recorded thereon statements and instructions executable by the processor 302 for performing any of the aforementioned method operations described above.

Figure 3:
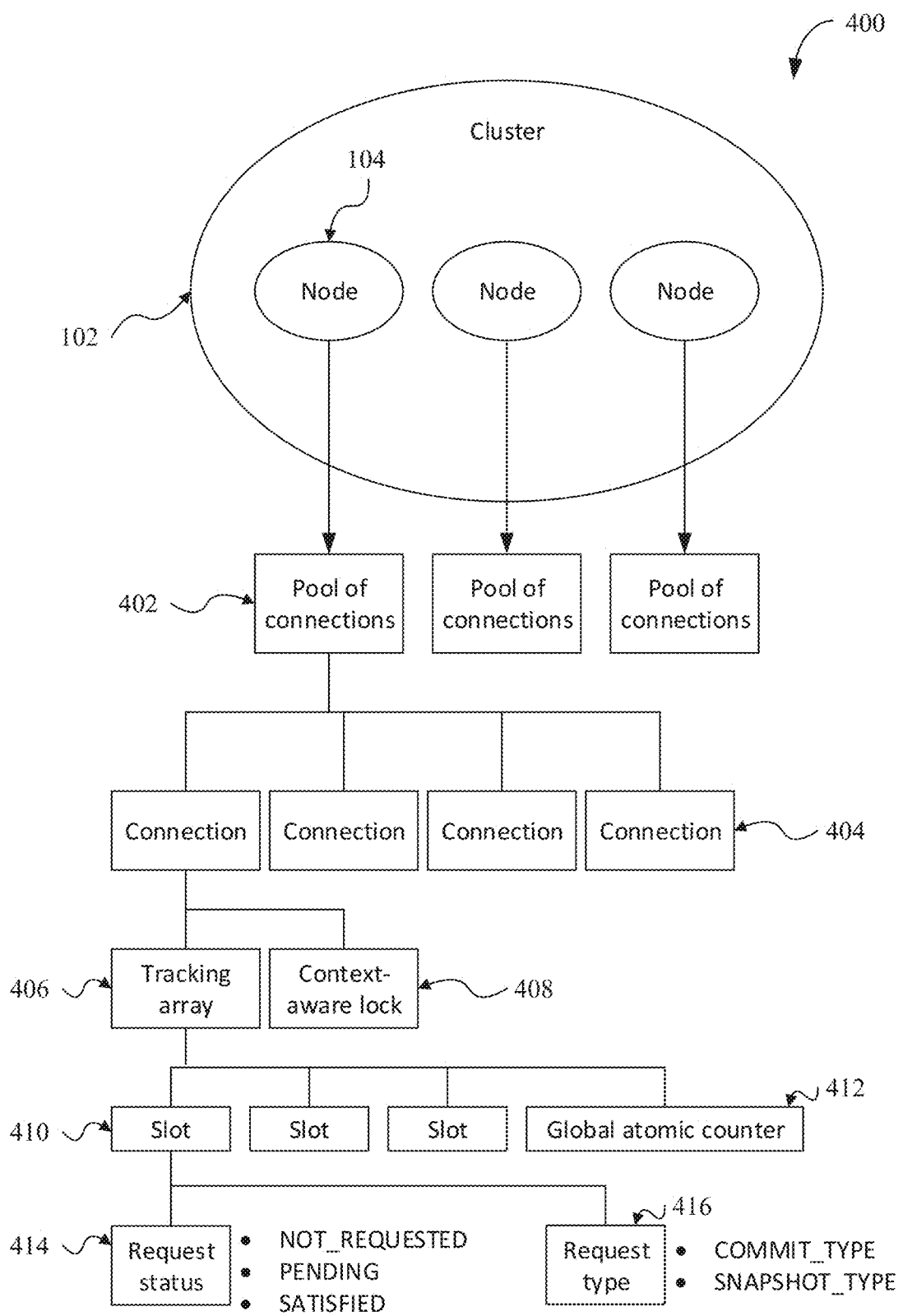
FIG. 3 illustrates a view of an RDBMS system according to an embodiment.

FIG. 3 illustrates a view 400 of an RDBMS system according to an embodiment. A cluster 102 includes several nodes 104. Nodes 104 may be physical or virtual computing devices. Backends include threads that run on nodes 104. When the system initialized, configured, or reconfigured, a pool of connections 402, each with a limited number of connections 404 to the central GTM server 110 is created and initialized. The creation and initialization of connections 404 may be performed by a postmaster thread. Pools of connections 402 may be created once as part of the initialization of each node 104 in the cluster 102 and may be adjusted if the node is reconfigured later. The number of connections 404 in the pool 402 is limited in order to limit the maximum number of simultaneous connects from the cluster to the GTM server 110 to facilitate meeting performance requirements of the system.

Every pooled connection has a tracking array 406 of slots with each slot 410 representing a request to the central GTM. Each tracking array 406 has a global atomic counter 412 that is used to register a request in a unique slot in the tracking array 406. As well, every pooled connection is associated with a context-aware lock 408.

Each slot 410 has an associated status 414 used to keep track of the slot's request. Examples of status include "not requested (NOT_REQUESTED)," "pending (PENDING)," and "satisfied (SATISFIED)". When first initialized, status 414 for slots 410 are set to NOT_REQUESTED. Each slot 410 also has an associated request type 416 that indicates the type of request assigned to each slot. Request types include "COMMIT_TYPE" for commit requests, and "SNAPSHOT_TYPE" for snapshot requests.

Figure 4:
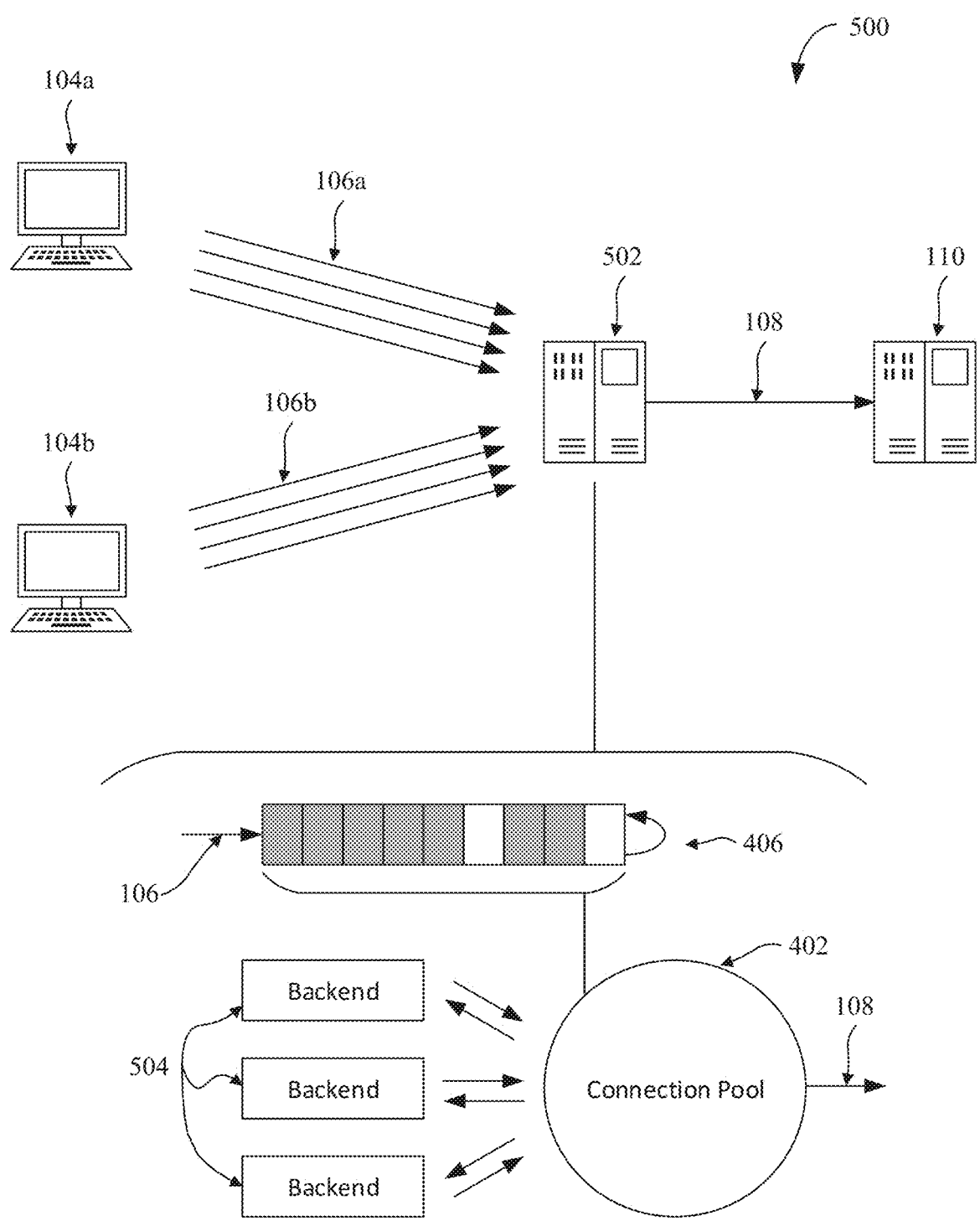
FIG. 4 illustrates a view of the operation of an RDBMS according to an embodiment.

FIG. 4 illustrates a view of the operation 500 of an DBMS according to an embodiment. Requests originate at nodes such as node 104*a* and node 104*b* in response to end user queries. Requests may include at least two types, one type of request is a snapshot request which is used to obtain the current value of the global timestamp (CSN) from the GTM server, and the other type of request is a commit request which is used to obtain the current value of the global timestamp and then increment it on the server atomically. The requests, of which there may be a large number, generate transmissions 106*a* and 106*b* to a node 502 in order to obtain a timestamp value or to increment and obtain the incremented timestamp.

Every backend 504 registers a request through network 106 in the tracking array 406 for its connection by incrementing the global atomic counter 412 and using the value as an index into tracking array 406 to obtain a unique slot 410. Once request is registered into slot 410 the status 414 of that slot may be changed from NOT_REQUESTED to PENDING. The backend node 504 may use the global atomic counter 412 value or another unique value that can be used to identify its own request. Registering the request may be done without holding lock 408.

Backends will then attempt to acquire the lock 408 for connection 404 in an exclusive mode. An exclusive lock facilitates reservation of the connection exclusively for the transaction that imposed the exclusive lock, as long as the transaction holds the lock. An exclusive lock can be imposed if there is no other shared or exclusive lock imposed already on the connection 404. Therefore, only one exclusive lock can be imposed one connection 404, and once imposed no other lock can be imposed on the connection 404. The backend that is successful in acquiring the lock will be responsible for processing a batch of pending requests that are already registered in the tracking array. Therefore, the owning backend that has acquired the lock for connection 404, which may be referred to as the "requestor backend," will cooperatively satisfy a number of pending requests along with its own request in a single communication round-trip (a request and associated response) to the central GTM server 110 using network 108.

Figure 5:
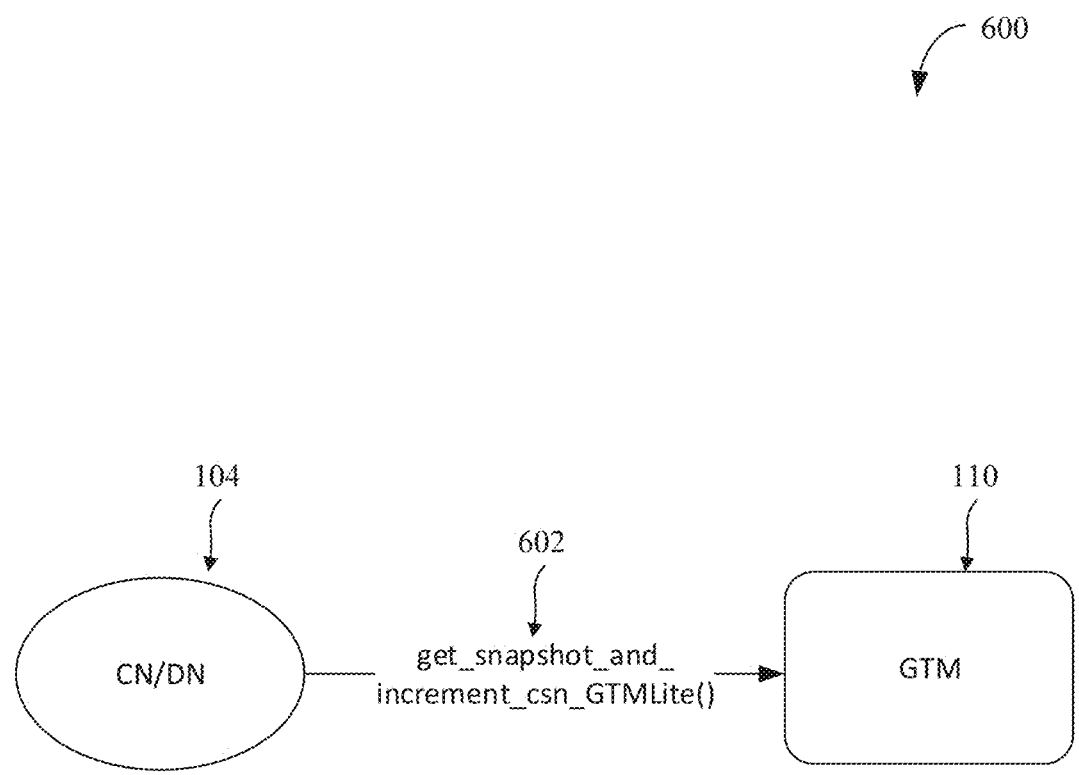
FIG. 5 illustrates an example of a database command, according to an embodiment.

FIG. 5 illustrates an example 600 of a database command 602, according to an embodiment where backend node 104 such as coordinator (CN) or datanode (DN), or requestor backend 504, uses a single command to obtain a snapshot and increment the CSN with GTM server 110. The request, "get_snapshot_and_increment_csn_GTMLite( )" is an atomic operation that will return a timestamp of the present value of the CSN from the GTM server 110 and then increment the CSN at the GTM server 110.

Figure 6:
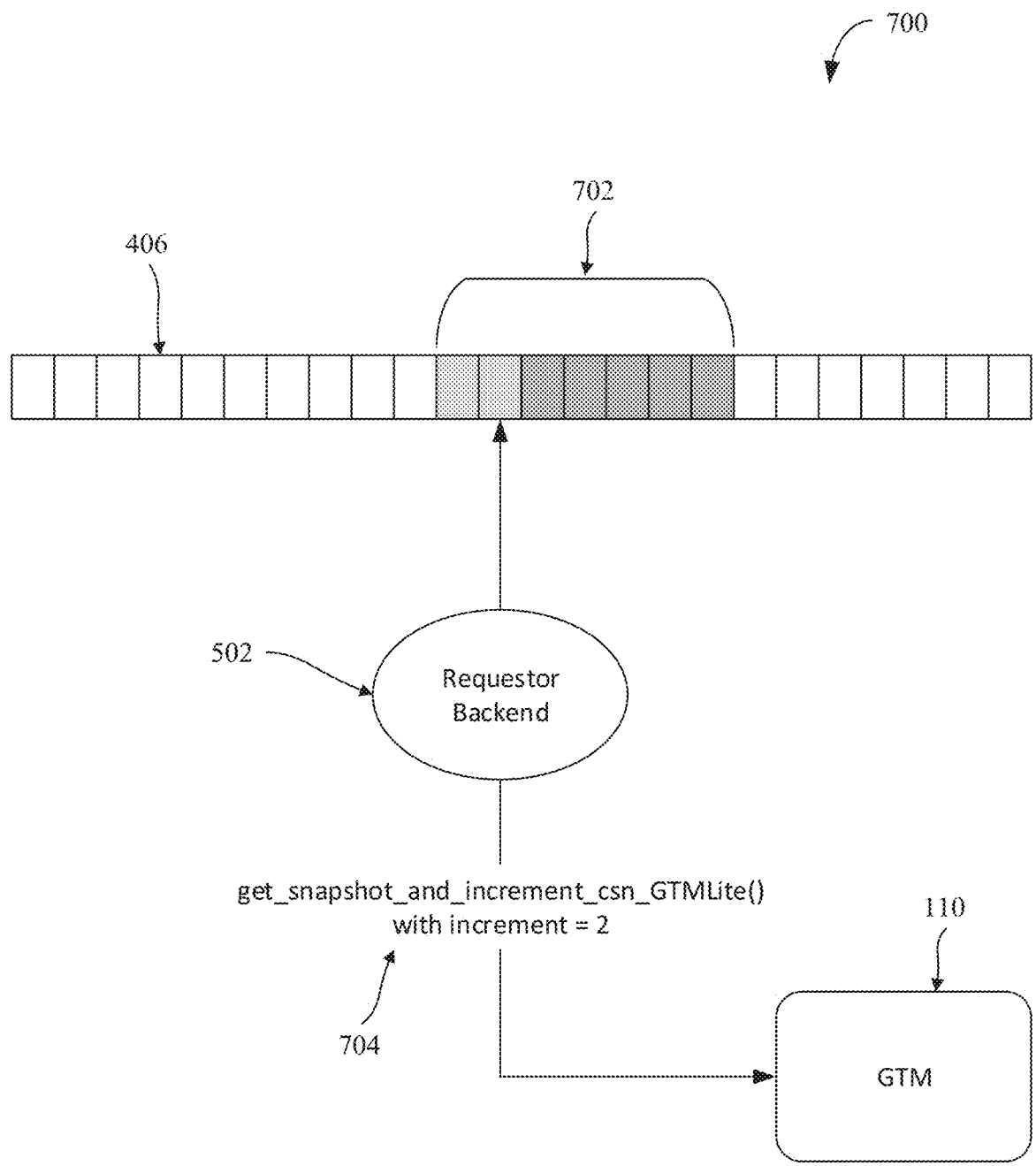
FIG. 6 illustrates interactions of a database command and tracking array, according to an embodiment.

FIG. 6 illustrates interactions 700 of a database command and tracking array 406, according to an embodiment. To determine the size of the batch, the requestor backend 502 will inspect a number of slots 410 in the tracking array 406 that is a subset of the total size of the tracking array 406 and includes the requestor backend's own slot. The size of the scan segment may be determined in a variety of ways, for example empirically to optimize the performance of the system. The scan segment 702 will typically be a relatively small subset of the whole tracking array 406 (e.g. ring buffer). Every batch of requests that is processed together can contain different kinds of requests including snapshot requests and commit requests. Thus, the protocol allows for a heterogeneous batch containing different types of requests to be processed together in one request 704 to the GTM server 110. When a batch of requests is processed, the total number of commit requests contained in the batch is calculated and is sent to the GTM server 110 as an aggregated increment for the global timestamp, for example as an argument of request 704. When the message is received at the GTM server 110, the current value of the global timestamp is returned to the requesting requestor backend 502 and the global timestamp is incremented by the increment value received at the GTM server 110.

Figure 7:
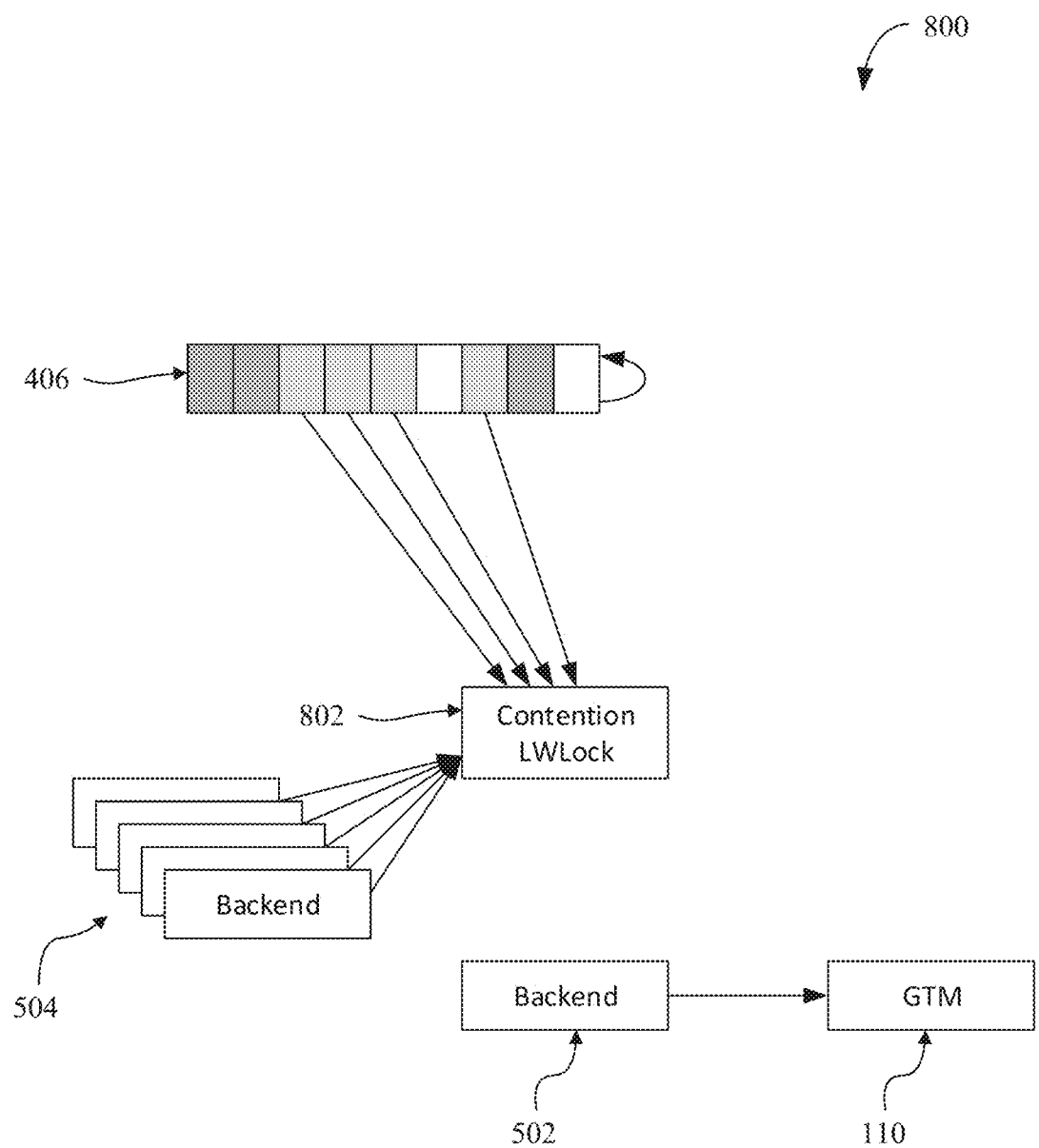
FIG. 7 illustrates the operation of a locking of a connection, according to an embodiment.

FIG. 7 illustrates the operation 800 of a locking of a connection, according to an embodiment. Various backends 504 have made requests, which may be snapshot requests, commit requests, or a combination of the two types or others that require a global timestamp from the GTM server 110. The requests are stored in tracking array 406. Requestor backend 502 has also made a request, such as a snapshot request or a commit request, that requires a timestamp from the GTM server 110. Furthermore, backend 502 has obtained a lock for connection 108 to the GTM server 110. Backend 502 creates a batch of requests including its own request and the requests of backends 504 and sends them in a single command to GTM server 110.

When the response is received from the GTM server 110, back at the requester backend node 502, the current value of the global timestamp is used to satisfy all the snapshot requests in the batch. Snapshot requests receive the timestamp value as returned from the GTM server 110. Commit requests each receive unique timestamps value. For example, a first commit request may receive the timestamp as returned from the GTM server 110, the same timestamp as supplied to the snapshot requests. The second commit request will receive the returned timestamp incremented by one. A third commit request will receive the returned timestamp incremented by two. This process may continue until each commit request has received a unique sequential timestamp.

When processing is complete, all status of entries corresponding to requests in the scan segment are changed to "SATISFIED" status to indicate to waiting backends 504 that their request is ready to be consumed. Following this, the requestor backend 502 releases the context-aware lock 408. In response to the lock 408 being released, the waiting backends 504 whose request is satisfied are woken up to allow them to obtain their timestamps and may process their requests. In embodiments, context-aware lock 408 will wake up and notify backends 504 that their timestamp requests have been satisfied and that timestamps may be read from array 406. In embodiments, context-aware lock 408 will grant the lock to another backend that is waiting for the lock.

Figure 8:
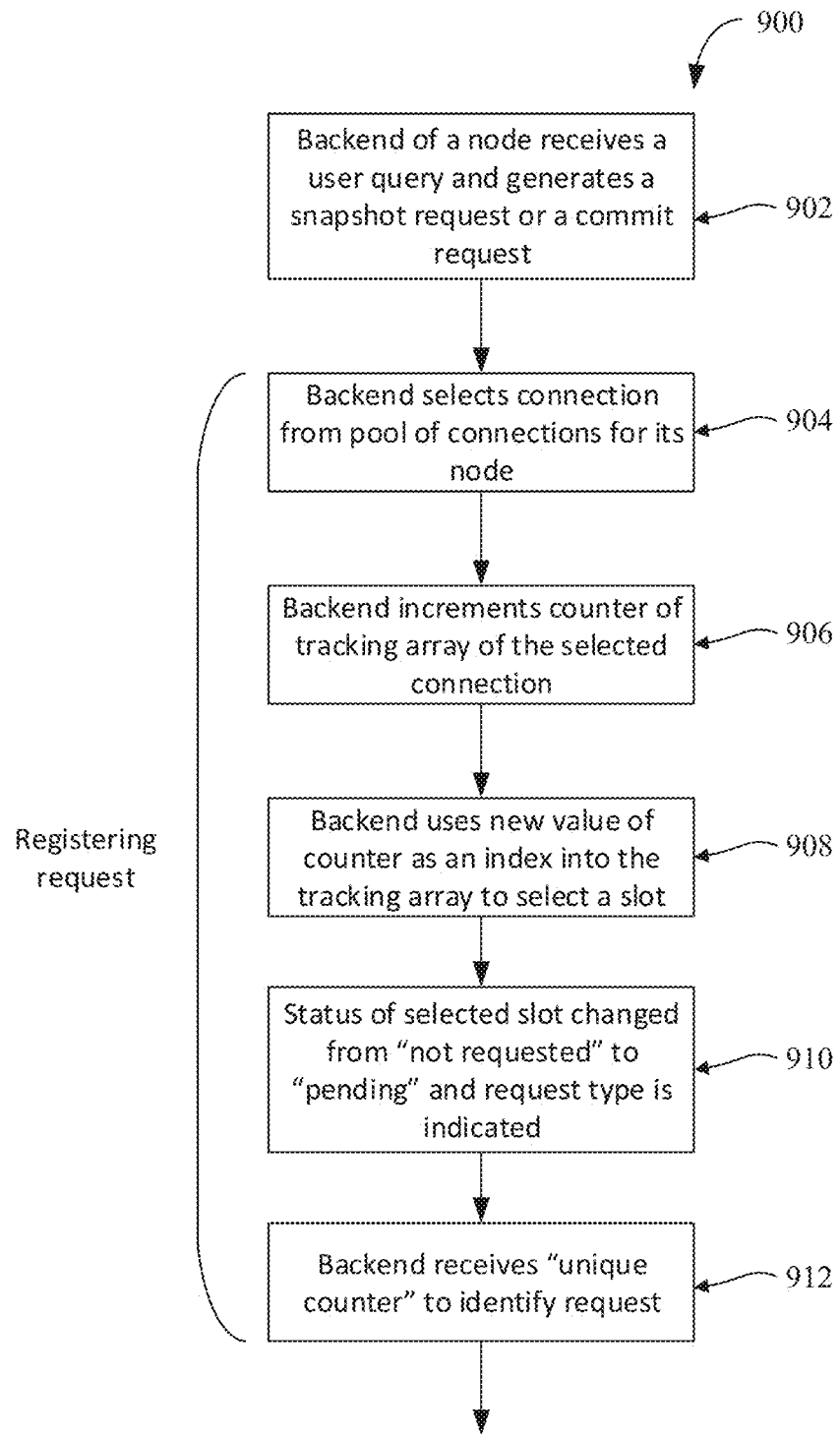
FIG. 8 illustrates a method for registering a request, according to an embodiment.

FIG. 8 illustrates a method 900 for registering a request, according to an embodiment. In step 902, a backend 502 of a node receives a user query and generates a request such as a snapshot request or a commit request. In step 904, the backend 502 selects a connection 404 from the pool of connections 402 for its node 104. In step 906, the backend 502 increments the counter 412 of the tracking array 406 of the selected connection 404. In step 908, backend 502 uses the new, incremented value of the counter 412 as an index into the tracking array 406 to select a slot 410. In step 910, the status of selected slot 410 is changed from "NOT_REQUESTED" to "PENDING." In step 912, backend 502 receives a unique counter or identifier to identify the request afterwards until it is completed.

Figure 9:
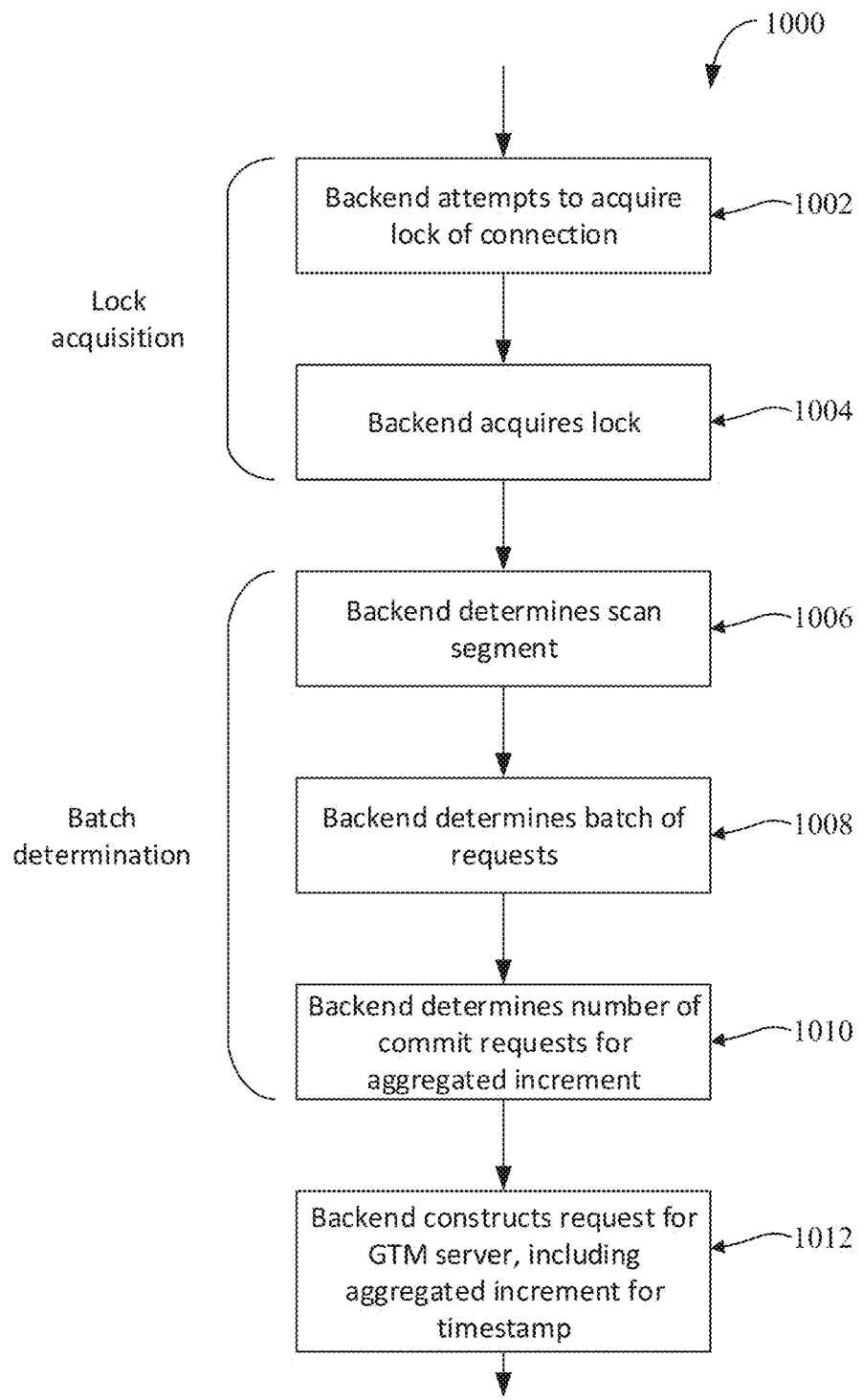
FIG. 9 illustrates methods of lock acquisition and batch determination, according to an embodiment.

FIG. 9 illustrates methods 1000 of lock acquisition and batch determination, according to an embodiment. In step 1002, backend 502 attempts to acquire context-aware lock 408 of selected connection 404. In step 1004, backend 502 acquires lock 408 to complete lock acquisition. If requestor backend 502 is unable to obtain lock 408 it is forced to wait until the lock is obtained, which may be done by the lock itself when released by another backend. In some cases, while the backend is waiting to receive lock 408, its request may be satisfied by another batch request initiated by another backend.

In step 1006 backend 502 determines the scan segment used to batch other requests together. In step 1008, backend 502 determines the requests and slots that make up the batch of requests. In step 1010, backend 502 determines the number of requests, such as commit requests, that require the global timestamp to be incremented. The number of requests is used to determine an aggregate increment value. In step 1012, backend 502 constructs a request to be sent to the GTM server that includes the aggregated increment value for the timestamp CSN.

Figure 10:
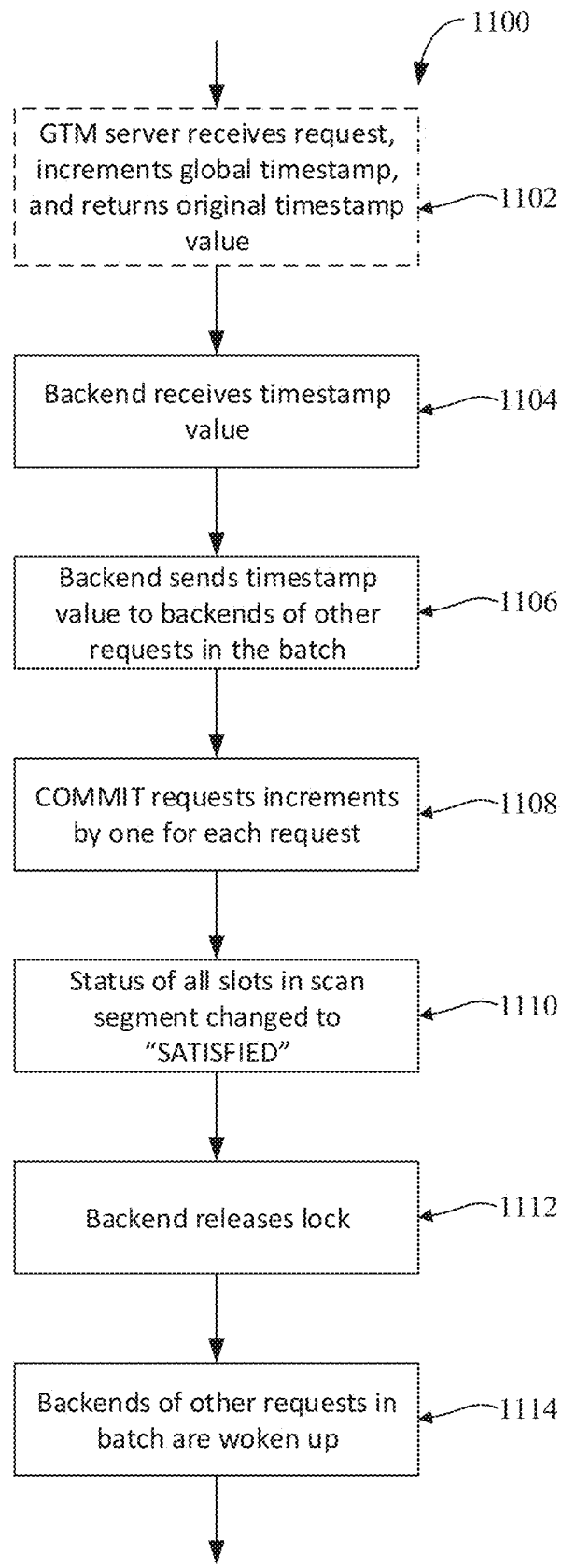
FIG. 10 illustrates methods of interactions with a GTM server and other methods, according to an embodiment.

FIG. 10 illustrates methods 1100 of interactions with a GTM server and other methods, according to an embodiment. In step 1102, the GTM server 110 receives the request from backend 502 and returns the current timestamp to the backend 502. The GTM server 110 then increments the global timestamp CSN by the aggregated increment value. In step 1104, the backend 502 receives the current timestamp value. In step 1106, backend 502 updates a tracking array with the timestamp values to allow backends 504 of other requests in the batch to access them. In step 1108, the current timestamp is used to satisfy all the pending snapshot requests in the batch. Each pending commit requests receives a sequential timestamp value. A first commit request receives the current timestamp. A second commit request receives the current timestamp incremented by one. Each subsequent commit request receives a unique sequential timestamp, incremented for each commit request. In step 1110, the status of all slots in the scan segment are changed to "SATISFIED." In step 1112, backend 502 releases the lock. In step 1114, in response to the lock being released, the backends of other requests are woken up to allow them to obtain their timestamp and service their request. Once a backend completes servicing its request, it's status may be changed to NOT_REQUESTED.

An example of an embodiment includes one node 104 of cluster 102 running an instance of a distributed database. Pool of connections 402 is initialized with five pooled connections 404 when the database instance is started. Each pooled connection 404 establishes a TCP/IP socket connection to GTM Server 110 and the pooled connection 404 is added to the pool of ready connections 402. Pooled connections 402 in this example are numbered 0 to 4.

When added to the pool of ready connections 402, each pooled connection's tracking array 406 is initialized so that the slot's tracking array is cleared, and the global counter 412 for each slot array is initialized to 0. In this example, each tracking array 406 has 1024 slots, numbered from 0 to 1023.

Each slot 410 in the tracking array will contain one request entry that includes a request status 414 and a request type 416. Each request entry can be either a commit request or a snapshot request. Request type field 416 can be either a COMMIT_TYPE or a SNAPSHOT_TYPE. Each request status field 414 can be either NOT_REQUESTED, PENDING, or SATISFIED. When each pooled connection's tracking array 406 is initialized all request statuses are initialized to NOT_REQUESTED.

Backend 502, which corresponds to a thread handling a single user query, generates a transaction commit request. System code has randomly assigned backends to connections to facilitate somewhat equal distribution of backends to available pooled connections. Backend 502 will register its request in the tracking array 406 of its assigned pooled connection, in this example, connection number 3.

Backend 502 reads the global counter 412 of connection 3 which has a value of 70. Backend 502 increment the global counter so that it reads 71. In this way, the next backend would read 71. Backend 502 uses 70 as an index into the tracking array 406 and finds that the slot of index 70 has a NOT_REQUESTED status. Backend 502 changes the request status 414 of slot 70 to PENDING and sets its request type 416 to COMMIT_TYPE, matching the commit request generated in response to the user query.

Backend 502 will then try to obtain the exclusive lock for connection 3 and succeeds. Backend 502 is now the sole user of connection 3 while holding the lock. Backend 502 is now referred to as the "Requestor" backend.

Backend 502 will inspect 10 slots in the tracking array 406 around slot number 70 that holds the request of backend 502. Two slots before slot 70, slot 70 (its own slot) and 7 slots after slot 70 are selected as a scan segment 702. Therefore backend 502 inspects slots 68, 69, 70, 71, 72, 73, 74, 75, 76, 77. These slots constitute the scan segment 702.

Backend 504 determines that in addition to slot 70 that has a COMMIT_TYPE pending request, slot 74 has another COMMIT_TYPE pending request and slot 75 has a pending SNAPSHOT_TYPE request. Backend 504 computes the aggregated increment to be 2 since the total number of COMMIT_TYPE requests in the scan segment is 2.

Backend 502 uses the working connection 3 to call get_snapshot_and_incrments_csn_GTMLite( ) API to the GTM server 110 using an aggregated increment value of 2.

The GSN at the GTM server 110 has the current value of 1001. GTM server increments the GSN by 2 to 1003 and 1001 is returned to backend 502.

Backend 502 uses the value of 1001 that it obtained from GTM server 110 to populate the pending requests in slot 70 (first commit request) and 75 (snapshot request) so that both requests in 70 and 75 will have timestamp sequence numbers of 1001. Backend 502 will set the sequence number in the second commit request at slot 74 to 1002 so that different commit requests receive different timestamp sequence numbers. Backend 502 will then set all status fields of requests at slots 70, 74 and 75 to SATISFIED. Embodiments support an operation in which the final state of sequence numbers in requests is exactly the same as if each backend had gotten its own request to the GTM and handled it itself.

Backend 502 has now completed the batch transaction and will release the lock 408. Backend 502 will then use the sequence number value 1001 it obtained for its own commit transaction.

The context aware lock 408 now notifies the next backend that will own the lock. The lock 408 will also notify the backends that have a satisfied requests in the array 406. These are the backends owning request at slots 74 and 75. Those backends may now consume the sequence numbers in the slots even though they will not obtain the lock.

Figure 11:
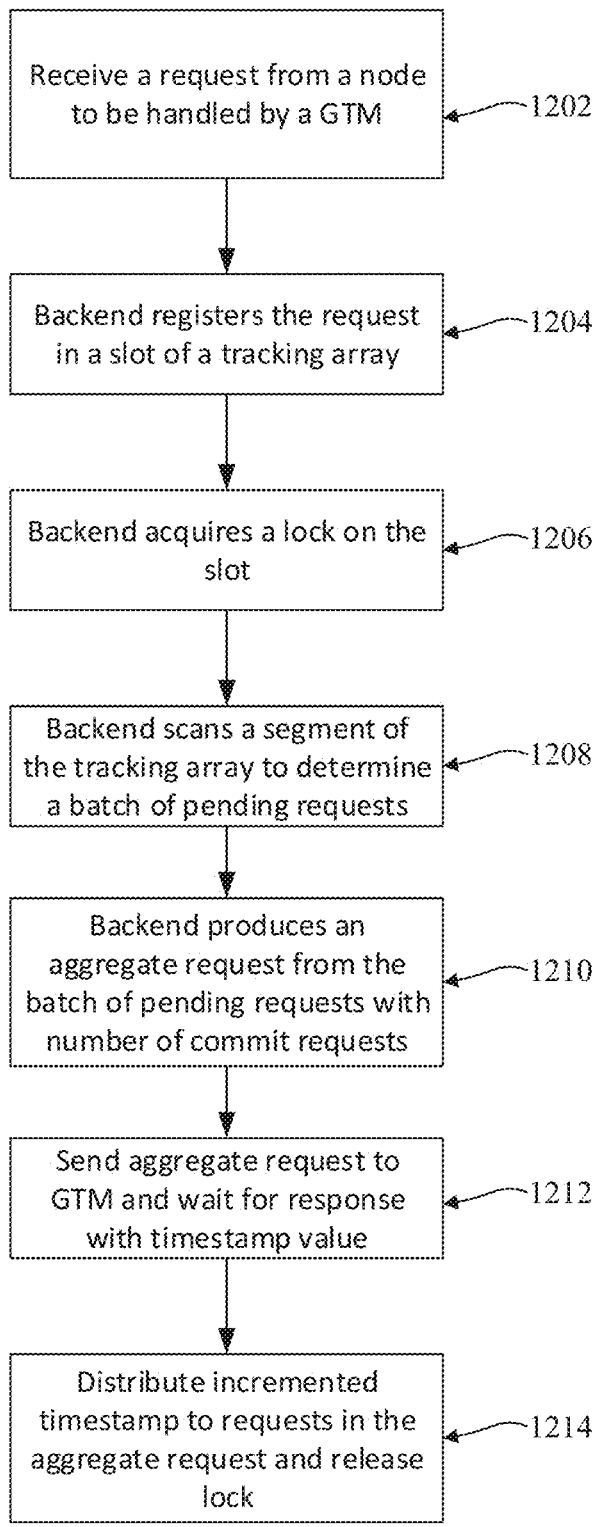
FIG. 11 illustrates an overview of methods as describes herein, according to an embodiment.

FIG. 11 illustrates an overview of methods illustrated in FIGS. 8, 9, and 10, as describes herein, according to an embodiment. In operation 1202, a request is received from a node, where the request is to be handled by a Global Transaction Manager (GTM) 110. In operation 1204, a backend 504 registers the request in a slot 410 in a tracking array 406 including a plurality of slots 410. Each of the plurality of slots 410 represents one of a plurality of requests for handling by the GTM 110. The plurality of requests includes the initial request of operation 1202. In operation 1206, the backend acquires a lock of the slot and in operation 1208, scans a segment of the tracking array 406 to determine a batch of pending requests where the batch includes the request. In operation 1210, the batch is used to produce an aggregate request that includes an aggregate increment of a total number of commit requests of the batch. In operation 1212, the aggregate request is sent using one of a plurality of pre-established connections to the GTM 110. A response is received from the GTM 110 that includes a current value of an incremented timestamp. In operation 1214, the incremented timestamp is then distributed to the plurality of requests of the batch and the backend releases the lock of the slot. In further embodiments, in response to releasing the lock of the slot in operation 1214, operations further include waking a plurality of backends of the plurality of requests of the batch.

It will be appreciated that, although specific embodiments of the technology have been described herein for purposes of illustration, various modifications may be made without departing from the scope of the technology. The specification and drawings are, accordingly, to be regarded simply as an illustration of the disclosure as defined by the appended claims, and are contemplated to cover any and all modifications, variations, combinations or equivalents that fall within the scope of the present disclosure. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Further, each operation of the method may be executed on any appropriate computing device, and pursuant to one or more, or a part of one or more, program elements, modules or objects generated from any programming language, such as C++, Java, or the like. In addition, each operation, or a file or object or the like implementing each said operation, may be executed by special purpose hardware or a circuit module designed for that purpose.

Through the descriptions of the preceding embodiments, the present disclosure may be implemented by using hardware only or by using software and a necessary universal hardware platform. Based on such understandings, the technical solution of the present disclosure may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present disclosure. For example, such an execution may correspond to a simulation of the logical operations as described herein. The software product may additionally or alternatively include number of instructions that enable a computer device to execute operations for configuring or programming a digital logic apparatus in accordance with embodiments of the present disclosure.

Although the present disclosure has been described with reference to specific features and embodiments thereof, it is evident that various modifications and combinations can be made thereto without departing from the disclosure. The specification and drawings are, accordingly, to be regarded simply as an illustration of the disclosure as defined by the appended claims, and are contemplated to cover any and all modifications, variations, combinations or equivalents that fall within the scope of the present disclosure.

What is claimed is:

1. A computer-implemented method for at least one processor operatively coupled to a computerized database system, the method comprising:
   registering a request in a slot in a tracking array comprising a plurality of slots, each slot of the plurality of slots representing one request of a plurality of requests including the request, the plurality of requests comprising at least one request requiring a global timestamp and at least one request requiring a respective value of an incremented timestamp, the tracking array being stored in a computer memory in communication with the at least one processor;
   acquiring a lock of the slot;
   determining a batch of pending requests based on contents of the tracking array, the batch including the request, the batch being used to produce an atomic aggregate request which is representative of the batch and which is a single request representative of multiple parts, each part of the multiple parts corresponding to a respective member of the batch, the atomic aggregate request including an atomic aggregate increment value indicative of a total number of requests of the batch requiring the respective values of the incremented timestamp;
   producing and sending the atomic aggregate request to a global transaction manager (GTM);
   receiving a response from the GTM, the response including the incremented timestamp, the incremented timestamp having been incremented by the atomic aggregate increment value;
   distributing the incremented timestamp to the requests of the batch requiring the respective values of the incremented timestamp; and
   releasing the lock of the slot.

2. The method of claim 1, wherein the slot is determined by incrementing a counter of the tracking array to generate an incremented counter value and using the incremented counter value as an index into the plurality of slots of the tracking array.

3. The method of claim 2, wherein each slot of the plurality of slots includes a status.

4. The method of claim 2, wherein the incremented counter value is used as an identifier of the request.

5. The method of claim 1, wherein the distributing the incremented timestamp includes updating a status of the requests of the batch requiring the respective values of the incremented timestamp to indicate that the requests of the batch requiring the respective values of the incremented timestamp have been satisfied.

6. The method of claim 1, further comprising in response to releasing the lock of the slot, waking a plurality of backends which have generated some or all requests of the plurality of requests of the batch.

7. The method of claim 1, further comprising scanning a segment of the tracking array to determine the batch of pending requests.

8. A system for implementing multi-version concurrency control, the system comprising:
   a memory storing instructions and storing a tracking array; and
   at least one processor in communication with the memory and in communication with a computerized database, the at least one processor configured, upon execution of the instructions, to perform the following steps:
      register a request in a slot in the tracking array comprising a plurality of slots, each slot of the plurality of slots representing one request of a plurality of requests including the request, the plurality of requests comprising at least one request requiring a global timestamp and at least one request requiring a respective value of an incremented timestamp;
      acquire a lock of the slot;
      determine a batch of pending requests based on contents of the tracking array, the batch including the request, the batch being used to produce an atomic aggregate request which is representative of the batch and which is a single request representative of multiple parts, each part of the multiple parts corresponding to a respective member of the batch, the atomic aggregate request including an atomic aggregate increment value indicative of a total number of requests of the batch requiring the respective values of the incremented timestamp;
      produce and send the atomic aggregate request to a global transaction manager (GTM);
      receive a response from the GTM, the response including the incremented timestamp, the incremented timestamp having been incremented by the atomic aggregate increment value;
      distribute the incremented timestamp to the requests of the batch requiring the respective values of the incremented timestamp; and
      release the lock of the slot.

9. The system of claim 8, wherein the slot is determined by incrementing a counter of the tracking array to generate an incremented counter value and using the incremented counter value as an index into the plurality of slots of the tracking array.

10. The system of claim 9, wherein each slot of the plurality of slots includes a status.

11. The system of claim 9, wherein the incremented counter value is used as an identifier of the request.

12. The system of claim 8, wherein the distributing the incremented timestamp includes updating a status of the requests of the batch requiring the respective values of the incremented timestamp to indicate that the requests of the batch requiring the respective values of the incremented timestamp have been satisfied.

13. The system of claim 8, wherein in response to releasing the lock of the slot, the at least one processor one causes the system to wake a plurality of backends of the plurality of requests of the batch.

14. A non-transitory computer-readable medium storing computer instructions, that when executed by at least one processor operatively coupled to a computerized database system, cause an apparatus to:
  register a request in a slot in a tracking array comprising a plurality of slots, each slot of the plurality of slots representing one request of a plurality of requests including the request, the plurality of requests comprising at least one request requiring a global timestamp and at least one request requiring a respective value of the incremented timestamp, the tracking array being stored in the computer-readable medium;
  acquire a lock of the slot;
  determine a batch of pending requests based on contents of the tracking array, the batch including the request, the batch being used to produce an atomic aggregate request representative of the batch and which is a representative of multiple parts, each part of the multiple parts corresponding to a respective member of the batch, the atomic aggregate request including an atomic aggregate increment value indicative of a total number of requests of the batch requiring the respective values of the incremented timestamp;
  produce and send the atomic aggregate request to a global transaction manager (GTM);
  receive a response from the GTM, the response including the incremented timestamp, the incremented timestamp having been incremented by the atomic aggregate increment value;
  distribute the incremented timestamp to the requests of the batch requiring the respective values of the incremented timestamp; and
  release the lock of the slot.

15. The non-transitory computer-readable medium of claim 14, wherein the slot is determined by incrementing a counter of the tracking array to generate an incremented counter value and using the incremented counter value as an index into the plurality of slots of the tracking array.

16. The non-transitory computer-readable medium of claim 15, wherein each slot of the plurality of slots includes a status.

17. The non-transitory computer-readable medium of claim 15, wherein the incremented counter value is used as an identifier of the request.

18. The non-transitory computer-readable medium of claim 14, wherein the distributing the incremented timestamp includes updating a status of the requests of the batch requiring the respective values of the incremented timestamp to indicate that the requests of the batch requiring the respective values of the incremented timestamp have been satisfied.

19. The non-transitory computer-readable medium of claim 14, wherein in response to releasing the lock of the slot, the at least one processor causes the system to wake a plurality of backends of the plurality of requests of the batch.

20. The non-transitory computer-readable medium of claim 14, apparatus is further caused to scan a segment of the tracking array to determine the batch of pending requests.

* * * * *

UNITED STATES PATENT AND TRADEMARK OFFICE
CERTIFICATE OF CORRECTION

| | | |
|---|---|---|
| PATENT NO. | : 12,130,796 B2 | Page 1 of 1 |
| APPLICATION NO. | : 17/535832 | |
| DATED | : October 29, 2024 | |
| INVENTOR(S) | : Ronen Grosman et al. | |

It is certified that error appears in the above-identified patent and that said Letters Patent is hereby corrected as shown below:

In the Claims

Claim 14: "the batch being used to produce an atomic aggregate request representative of the batch and which is a representative of multiple parts, each" should read --the batch being used to produce an atomic aggregate request representative of the batch and which is a single request representative of multiple parts, each--

Signed and Sealed this
Twenty-ninth Day of April, 2025

Coke Morgan Stewart
*Acting Director of the United States Patent and Trademark Office*